United States Patent Office
3,476,748
Patented Nov. 4, 1969

3,476,748
SUBSTITUTED 6,7-DIHYDRO-5-H-
PYRIMIDINO THIAZINES
Leo Ralph Swett and James Daniel Ratajczyk, Waukegan, and Eugene Tatsuru Kimura, Morton Grove, Ill., assignors to Abbott Laboratories, North Chicago, Ill., a corporation of Illinois
No Drawing. Filed Jan. 4, 1967, Ser. No. 607,169
Int. Cl. C07d 93/12, 99/10; A61k 27/00
U.S. Cl. 260—243
3 Claims

ABSTRACT OF THE DISCLOSURE

The compounds are of the class of substituted 6,7-dihydro-5-H-pyrimidino-[3,5-b][1,4]-thiazines of the formula

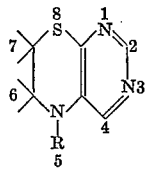

useful as anti-inflammatory, anti-pyretic and analgesic agents. This series is generally prepared by sequentially reducing 6,7 - dihydro - 5 - H - pyrimidino-[4,5-b][1,4]-thiazine-6-one, and subjecting this compound to the appropriate substitution or alkylation reaction with a halide of the formula R-halogen to add various moieties to the 5-position nitrogen atom of the thiazine ring.

SUMMARY OF INVENTION

This invention is directed to a novel series of chemical compounds having the general formula

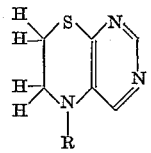

wherein R is selected from the group consisting of hydrogen, lower-alkyl, alkenyl, alkynyl, carbamoyl, substituted carbamoyl, thiocarbamoyl, substituted thiocarbamoyl, carboxymethyl, carbalkoxymethyl, diloweralkyl-aminoloweralkyl, N-piperidylloweralkyl, N-pyrrolidinyl-loweralkyl and N-morpholinoloweralkyl. The term "lower-alkyl" as used herein refers to carbon chains having 1 to 7 carbon atoms.

In general, these compounds are prepared by first reducing 6,7-dihydro-5-H-pyrimidino-[4,5-b][1,4]-thiazine-6-one to 6,7-dihydro-5-H-pyrimidino-[4,5-b][1,4]-thiazine, then subjecting this compound to the appropriate substitution or alkylation reaction to add various moieties to the 5-position nitrogen atom of the thiazine ring.

A process for preparing 6,7-dihydro-5-H-pyrimidino-[4,5-b][1,4]-thiazine-6-one is described in the Journal of Organic Chemistry, 1965, vol. 30, p. 1247. In general, this synthesis involves the reaction of 4,5-diamino-pyrimidine with mercaptoacetic acid with heating. The product is removed by filtration and crystallized from methanol or some other appropriate solvent.

To synthesize the compounds of the instant invention, the 6,7-dihydro-H-pyrimidino - [4,5-b][1,4] - thiazine-6-one is reacted with a reducing agent such as lithium aluminum hydride thereby reducing the 6-keto group to a 6-dihydro group. The resulting reduced compound may further be reacted to substitute various groups for the hydrogen on the 5-position. Generally, the substitution is carried out by reacting the 6,7-dihydro-5-H-pyrimidino-[4,5-b][1,4]-thiazine with halide of the R group to be substituted, in an inert solvent. By inert solvent is meant one which does not participate in the reaction and does not react with any of the components of the reaction mixture. The resulting substituted compound is then removed from the reaction mixture and crystallized from the appropriate solvent.

The following examples are presented to describe some of the various embodiments of our novel compounds and processes but not to limit the invention.

EXAMPLE 1

6,7-dihydro-5-H-pyrimidino-[4,5-b][1,4]-thiazine-6-one

A solution of 20 grams (0.18 mole) of 4.5-diamino-pyrimidine in 200 ml. of freshly distilled mercaptoacetic acid is heated at 148°–152° for 2 hours. The resulting red syrup is triturated in two 200 ml. portions of benzene, which is then removed by decantation. A solution of the residue in 50 ml. of 1,2-dimethoxyethane is stirred depositing a yellow-tan powder. The powder is collected by filtration of the cooled mixture with the aid of cold methanol. A solution of the crude product in 300 ml. of boiling methanol is treated with decolorizing carbon, filtered and concentrated. Slow cooling of the reaction yields 11.0 grams of 6,7-dihydro-5-H-pyrimidino-[4,5-b][1,4]-thiazine-6-one having a melting point of 299°–300° C.

Analysis. — Calculated for $C_6H_5N_3OS$: C=43.10; H=3.01; N=25.13. Found: C=43.13; H=3.02; N=25.11.

EXAMPLE 2

6,7-dihydro-5-H-pyrimidino-[4,5-b][1,4]-thiazine

To a suspension of 5.3 grams (0.14 mole) of lithium aluminum hydride in 250 ml. of tetrahydrofuran is added 11.6 grams (0.069 mole) of finely divided 6,7-dihydro-5-H-pyrimidino-[4,5-b][1,4]-thiazine-6-one. The mixture is stirred at 60°–70° C. overnight and decomposed with 5 ml. of water, 5 ml. of 15% sodium hydroxide solution and 15 ml. of water consecutively. The reaction mixture is filtered to remove the lithium aluminum salts which are washed with fresh tetrahydrofuran. The filtrate and washings are concentrated to an oily residue which slowly crystallize to a gummy semi-solid. Trituration with a small volume of water yields 6,7-dihydro-5-H-pyrimidino-[4,5-b][1,4]-thiazine as bright yellow needles having a melting point of 158°–159° C.

Analysis. — Calculated for $C_6H_7N_3S$: C=47.04; H=4.60; N=27.43; Found: C=46.88; H=4.61; N=27.47.

The various 5-substituted derivatives of the reduced 6,7-dihydro 5-H-pyrimidino-[4,5-b][1,4]-thiazine may be made according to either of two alternative procedures. If desired, one may start with the 6-keto compound as described in Example 1 and first substitute the appropriate —R group at the 5-position, then reduce the 6-position keto group to a dihydro group. The substitution or alkylation may be carried out by reacting 6,7-dihydro-5-H-pyrimidino-[4,5-b][1,4]-thiazine-6-one with the appropriate R-halide in an inert solvent such as benzene, dioxane, tetrahydrofuran and alcohol among others. The reaction is carried out in the presence of a metalating agent such as sodium hydride, sodamide, potassium carbonate, sodium carbonate or bicarbonate and various lithium salts among others. The metalating agent replaces the 5-position hydrogen with the corresponding metal-sodium, potassium or lithium, and the like. The R-halide then reacts with the metalated compound yielding a metal-halide salt and the alkylated product. The recovered product is then subjected to reduction to reduce the 6-keto group to 6-dihydro. This is accomplished by reacting the compound with a reducing agent such as lithium aluminum hydride, or by a catalytic hydrogenation reaction over a platinum catalyst, among other procedures. The recovered product has the desired R-group substituted on the 5-position nitrogen atom of the thiazine ring, and a methylene (—CH₂) group in the 6-position of the thiazine group. Alternatively, the 6,7-dihydro-5-H-pyrimidino-[4,5-b][1,4]-thiazine-6-one may first be reduced to 6,7-dihydro-5-H-pyrimidino-[4,5-b][1,4]-thiazine, and then subjected to the substitution reaction to alkylate the 5-position nitrogen atom of the thiazine ring. The particular sequence of steps is not deemed to be critical to the practice of this invention.

The table following below illustrates some of the reagents which may be reacted with either the 6-keto or the 6,7-dihydro-5-H-pyrimidino-[4,5-b][1,4]-thiazine (depending upon whether the reaction of the 6-keto group is carried out prior or subsequent to the 5-position substitution), and the resulting products. In each case, the product has reference to Formula I wherein the 6-position is reduced to the dihydro group, the table merely describing the R-group substituted at the 5-position. Of course, this list is not exhaustive of the possible compounds within the scope of this invention but is merely intended to exemplify some of the novel compounds.

TABLE 1—Continued

| Reagent | R-Group |
|---|---|
| (11) Ethylisocyanate | —C(=O)—NHC₂H₅ |
| (12) 3-dimethylaminopropyl chloride | —(CH₂)₃—N—(CH₃)₂ |
| (13) 3-(N-pyrrolidino) propyl chloride | —(CH₂)₂—CH₂—N⟨pyrrolidino⟩ |
| (14) 2-(N-piperidino) ethyl chloride | —CH₂—CH₂—N⟨piperidino⟩ |
| (15) 4-(N-morpholino) butyl bromide | —(CH₂)₃—CH₂—N⟨morpholino⟩ |

The novel compounds of this invention display activity as anti-inflammatory, anti-pyretic and analgesic agents. When such tests as the Carrageenin Induced Rat Paw Edema Test, the Yeast Anti-Pyresis Test, and the Acetic Acid Induced Writhing Test are performed on mice, marked edemic inhibition, anti-pyretic and analgesic effects are noted. The following table shows the pharmacological activity of 6,7-dihydro-5-H-pyrimidino [4,5-b] [1,4]-thiazine as measured in the aforementioned tests performed on mice.

TABLE II

| Compounds | Carrageenin Induced Rat Paw Test | |
|---|---|---|
| | Oral Dosage in mg./kg. body weight | Percent Inhibition |
| 6,7-dihydro-5-H-pyrimidino-[4,5-b] [1,4]-thiazine | 5 | 10 |
| | 10 | 37 |
| | 50 | 29 |
| | 100 | 39 |
| | ED₂₅=18 mg./kg.[1] | |

| | Yeats Anti-Pyresis Test | |
|---|---|---|
| | Oral Dosage | Percent Reduction |
| 6,7-dihydro-5-H-pyrimidino-[4,5-b] [1,4]-thiazine | 10 | 19 |
| | 35 | 12 |
| | 50 | 71 |
| | 100 | 56 |
| | ED₂₅=64 mg./kg.[1] | |

| | Acetic Acid Induced Writhing Test | |
|---|---|---|
| | Oral Dosage | Percent Inhibition |
| 6,7-dihydro-5-H-pyrimidino-[4,5-b] [1,4]-thiazine | 25 | 27 |
| | 50 | 40 |
| | 100 | 62 |
| | 200 | 92 |
| | ED₅₀=60 mg./kg.[2] | |

[1] ED₂₅ indicates the efficacy dosage of which there is a 25% inhibition of the induced malady.
[2] ED₅₀ indicates the efficacy dosage at which there is a 50% inhibition of the induced malady.

TABLE 1

| Reagent | R-Group |
|---|---|
| (1) Methylchloride | —CH₃ |
| (2) Allyl bromide | —CH₂CH=CH₂ |
| (3) 1-bromo-2-butyne | —CH₂C≡CCH₃ |
| (4) Propargyl bromide | —CH₂C≡CH |
| (5) Benzyl bromide | —CH₂—⟨phenyl⟩ |
| (6) Chloroacetamide | —CH₂—C(=O)—NH₂ |
| (7) Ethyl chloroacetate | —CH₂—C(=O)—OC₂H₅ |
| (8) 3-chloropropanol | —(CH₂)₃OH |
| (9) Bromoacetic acid | —CH₂COOH |
| (10) Methylisothiocyanate | —C(=S)—NHCH₃ |

The lethal dosage of the aforementioned compound is 670 mg./kg. of animal body weight, which represents the dosage level at which 50% of the animals expire. It can readily be seen that the ratio between the efficacy dosage and the lethal dosage is sufficiently large resulting in a safe dosage margin or a large therapeutic index. Other compounds of this invention display similar pharmacological results.

It will be appreciated by those skilled in the art that the novel compounds of this invention may be administered in either the free base form, or as non-toxic acid-addition salts such as the hydrochloride, fumarate, sulphate, phosphate and the like. The particular form utilized is obviously only dictated by the pharmacological activity of the species used. Toxic salts may be utilized as intermediates for making the pharmacologically acceptable free bases and non-toxic salts and are therefore useful in that sense.

We claim:
1. A compound of the formula

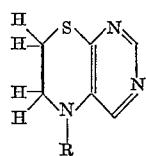

wherein R is a member selected from the group consisting of hydrogen, loweralkyl, loweralkenyl, loweralkynyl, carbamoyl, loweralkyl substituted carbamoyl, thiocarbamoyl, loweralkyl substituted thiocarbamoyl, carboxymethyl, carbloweralkoxymethyl, benzyl, hydroxyloweralkyl, diloweralkylaminoloweralkyl, N-piperidylloweralkyl, N-pyrrolidinylloweralkyl and N-morpholinoloweralkyl, and the pharmacologically acceptable acid addition salts thereof.

2. A compound according to claim 1 wherein R is hydrogen.

3. A method for making a compound of the formula

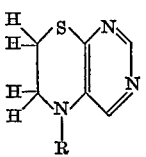

wherein R is a member selected from the group consisting of hydrogen, loweralkyl, loweralkenyl, loweralkynyl, carbamoyl, loweralkyl substituted carbamoyl, thiocarbamoyl, loweralkyl substituted thiocarbamoyl, carboxymethyl, carbloweralkoxymethyl, benzyl, hydroxyloweralkyl, diloweralkylaminoloweralkyl, N-piperidylloweralkyl, N-pyrrolidinylloweralkyl and N-morpholinoloweralkyl comprising the steps of contacting a compound of the formula

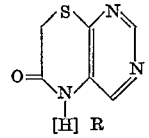

wherein R is as previously defined with 2 moles of lithiumaluminum hydride per mole of the starting compound at a temperature of between about 60° to 70° C. for a period of about 15 hours in the presence of an inert solvent, and recovering the product.

References Cited

UNITED STATES PATENTS

| | | | |
|---|---|---|---|
| 3,080,364 | 3/1963 | Schroeder | 260—243 |
| 3,124,577 | 3/1964 | Lowrie | 260—243 |
| 3,299,051 | 1/1967 | Stein et al. | 260—243 |

OTHER REFERENCES

Taylor et al., J. Org. Chem., vol. 29, pp. 2121–4 (1964).

HENRY R. JILES, Primary Examiner

JOHN M. FORD, Assistant Examiner

U.S. Cl. X.R.

260—999

PO-1050
(5/69)

UNITED STATES PATENT OFFICE
CERTIFICATE OF CORRECTION

Patent No. 3,476,748    Dated November 4, 1969

Inventor(s) Leo Ralph Swett and James Daniel Ratajczyk and Eugene Tatsuru Kimura It is certified that error appears in the above-identified patent and that said Letters Patent are hereby corrected as shown below:

Column 1, line 14, immediately following "pyrimidino-[" the numeral "3" should read "4"

In the formula in Column 6, delete "[H]"

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents